United States Patent
Wu et al.

(10) Patent No.: US 6,771,872 B2
(45) Date of Patent: Aug. 3, 2004

(54) ROTATABLE HOLDER

(75) Inventors: Kun-Tsan Wu, Tu-Chen (TW); Shang Chin Liao, Tu-chen (TW)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 313 days.

(21) Appl. No.: 10/036,203

(22) Filed: Dec. 24, 2001

(65) Prior Publication Data

US 2003/0086675 A1 May 8, 2003

(30) Foreign Application Priority Data

Nov. 7, 2001 (TW) ...................................... 90219106 U

(51) Int. Cl.[7] ................................................. G02B 6/00
(52) U.S. Cl. ...................................... 385/137; 385/136
(58) Field of Search ................................. 385/136, 137

(56) References Cited

U.S. PATENT DOCUMENTS 5,630,723 A * 5/1997 Kawamoto ................... 439/164
6,510,274 B1 * 1/2003 Wu et al. ..................... 385/137
6,636,680 B2 * 10/2003 Wu et al. ..................... 385/137
6,654,537 B2 * 11/2003 Wu et al. ..................... 385/137
6,684,021 B2 * 1/2004 Wu et al. ..................... 385/137

FOREIGN PATENT DOCUMENTS

JP 11052210 A * 2/1999 ............ G02B/7/04

* cited by examiner

Primary Examiner—Rodney Bovernick
Assistant Examiner—Juliana K. Kang
(74) Attorney, Agent, or Firm—Wei Te Chung

(57) ABSTRACT

An optical fiber holder (6) includes an optical fiber retainer (2), a C-shaped spacer (3), and a base (4) having a fixing hole (41) defined therein. The optical fiber retainer has a fixing portion (22), and a retaining portion (21) for retaining a number of optical fibers (5) therein. The fixing portion of the optical fiber retainer is encircled by the C-shaped spacer, and received in the hole of the base. The C-shaped spacer is tightly retained in an annular groove (411) defined in the base around the hole. The optical fiber retainer can rotate with respect to the retained C-shaped spacer.

11 Claims, 5 Drawing Sheets

ROTATABLE HOLDER

BACKGROUND OF THE INVENTION

1. Field of the Invention

The present invention relates to optical fiber holders, and particularly to rotatable holders for holding and arranging optical fibers.

2. Description of Related Art

Routes of optical fibers or cables in an optical device need to be arranged according to the particular requirements of the optical device. Optical fiber or cable holders are generally used to arrange the optical fibers or cables on such routes. Nowadays, most holders for holding optical fibers are conventional cable holders which are used for holding copper wires. However, optical fibers are more frangible than copper wires. Conventional cable holders allow undesired bending, damage and even breakage of optical fibers.

U.S. Pat. No. 5,149,027 discloses a U-shaped cable holder comprising two legs. Snap fit projections are formed on both an inside and an outside of each leg of the cable holder at different relative heights with respect to a central member of the cable holder. The legs can be inserted through first and second openings to be held by inside edges of the first and second openings, or can be inserted in first and third openings to be held by outmost edges of the first and third openings. Unfortunately, the cable holder is not suitable for holding optical fibers. It is prone to allow undesired bending, damage and even breakage of optical fibers.

SUMMARY OF THE INVENTION

In view of the above, an object of the present invention is to provide an optical fiber holder having a retainer that is rotatable with respect to a base of the holder.

Another object of the present invention is to provide an optical fiber holder which is easily used within a housing of an optical device.

In order to achieve the above-mentioned objects, an optical fiber holder of the present invention includes an optical fiber retainer, a C-shaped spacer and a base having a fixing hole defined therein. The optical fiber retainer has a fixing portion, and a retaining portion for retaining a plurality of optical fibers therein. The fixing portion of the optical fiber retainer is encircled by the C-shaped spacer, and received in the hole of the base. The C-shaped spacer is tightly retained in an annular groove defined in the base around the hole. The optical fiber retainer can rotate with respect to the retained C-shaped spacer.

Other objects, advantages and novel features of the invention will become more apparent from the following detailed description when taken in conjunction with the accompanying drawings, in which:

DETAILED DESCRIPTION OF PREFERRED EMBODIMENT

Reference will now be made to the drawings to describe the present invention in detail.

Figure 1:
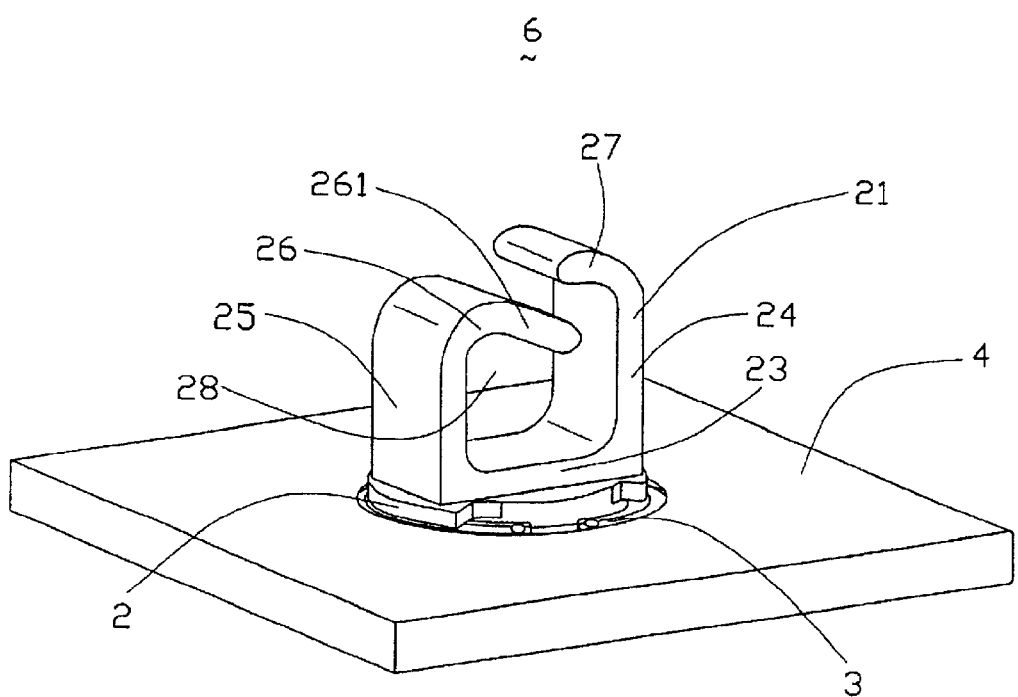
FIG. 1 is a perspective view of an optical fiber holder in accordance with the present invention.

Referring to FIG. 1, an optical fiber holder 6 in accordance with the present invention comprises an optical fiber retainer 2, a C-shaped spacer 3 and a base 4. The base 4 can be fixed to a housing of an optical device or constructed as a portion of the housing where optical fibers 5 (shown in FIG. 5) are located.

Figure 2:
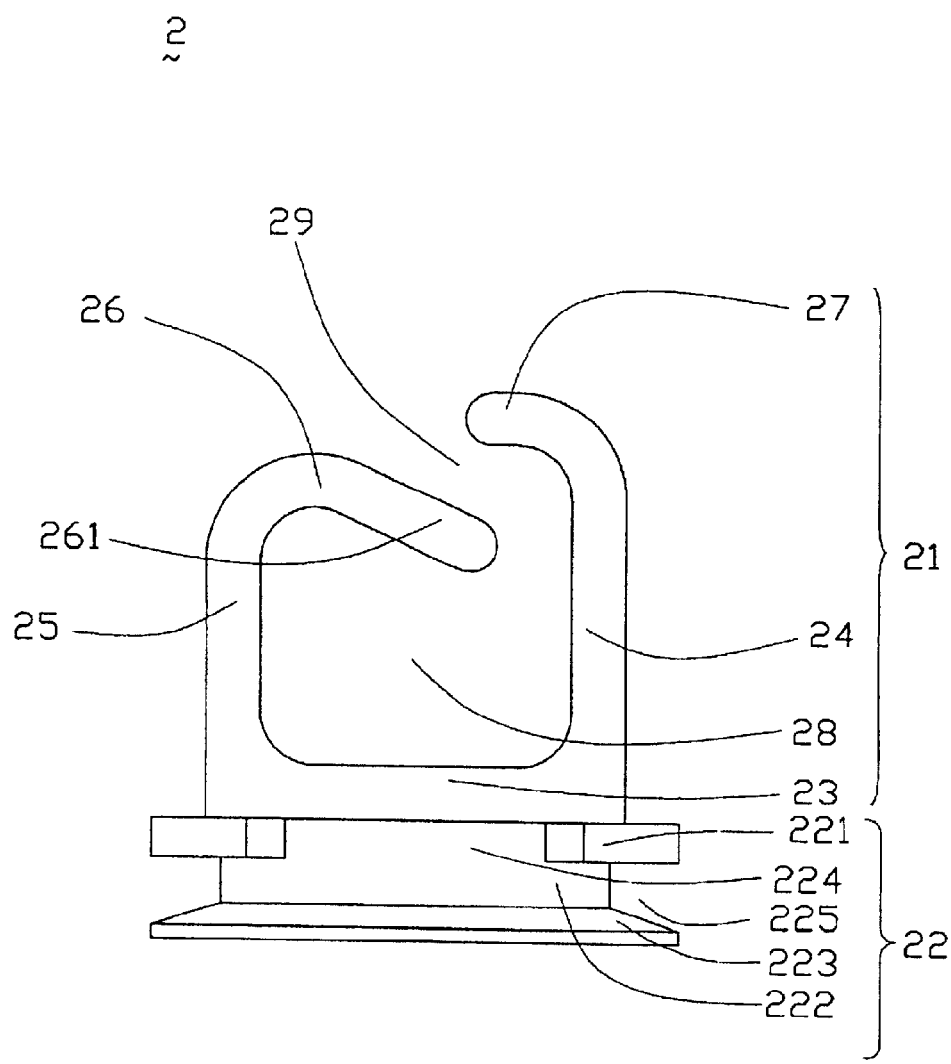
FIG. 2 is a front view of an optical fiber retainer of the optical fiber holder of FIG. 1.

FIG. 2 is a perspective view of the optical fiber retainer 2, which can be formed by conventional one-shot molding. The optical fiber retainer 2 comprises a retaining portion 21 and a fixing portion 22. The retaining portion 21 comprises a lower part 23, a first wall 24, and a second wall 25. The first and second walls 24, 25 extend upwardly from the lower part 23. A retaining space 28 is defined between the lower part 23, the first wall 24 and the second wall 25. Upper parts of the first and second walls 24, 25 are bent inwardly to respectively form a first bent portion 27 of the first wall 24 and a second bent portion 26 of the second wall 25. The second bent portion 26 is further bent downwardly such that a tip extremity 261 thereof is subjacent to the first bent portion 27. Thus an opening 29 is defined between the first and second bent portions 27, 26. A shortest distance between the first and second bent portions 27, 26 is slightly less than a diameter of any optical fiber 5, to ensure secure receipt of the optical fibers 5 in the retaining portion 21.

The fixing portion 22 comprises a cylindrical main body 222, an annular flange 221 and a slanted base part 223. The annular flange 221 is formed around a circumference of the main body 222, and supports the lower part 23 of the retaining portion 21. A diameter of the annular flange 221 is equal to a diameter of the slanted base part 223. The diameters of the annular flange 221 and slanted base part 233 are greater than a diameter of the main body 222. The annular flange 221, main body 222 and the slanted part 223 cooperatively define an annular groove 225 therebetween, for receiving the C-shaped spacer 3 therein. The annular flange 221 defines a cutout 224.

Figure 3:
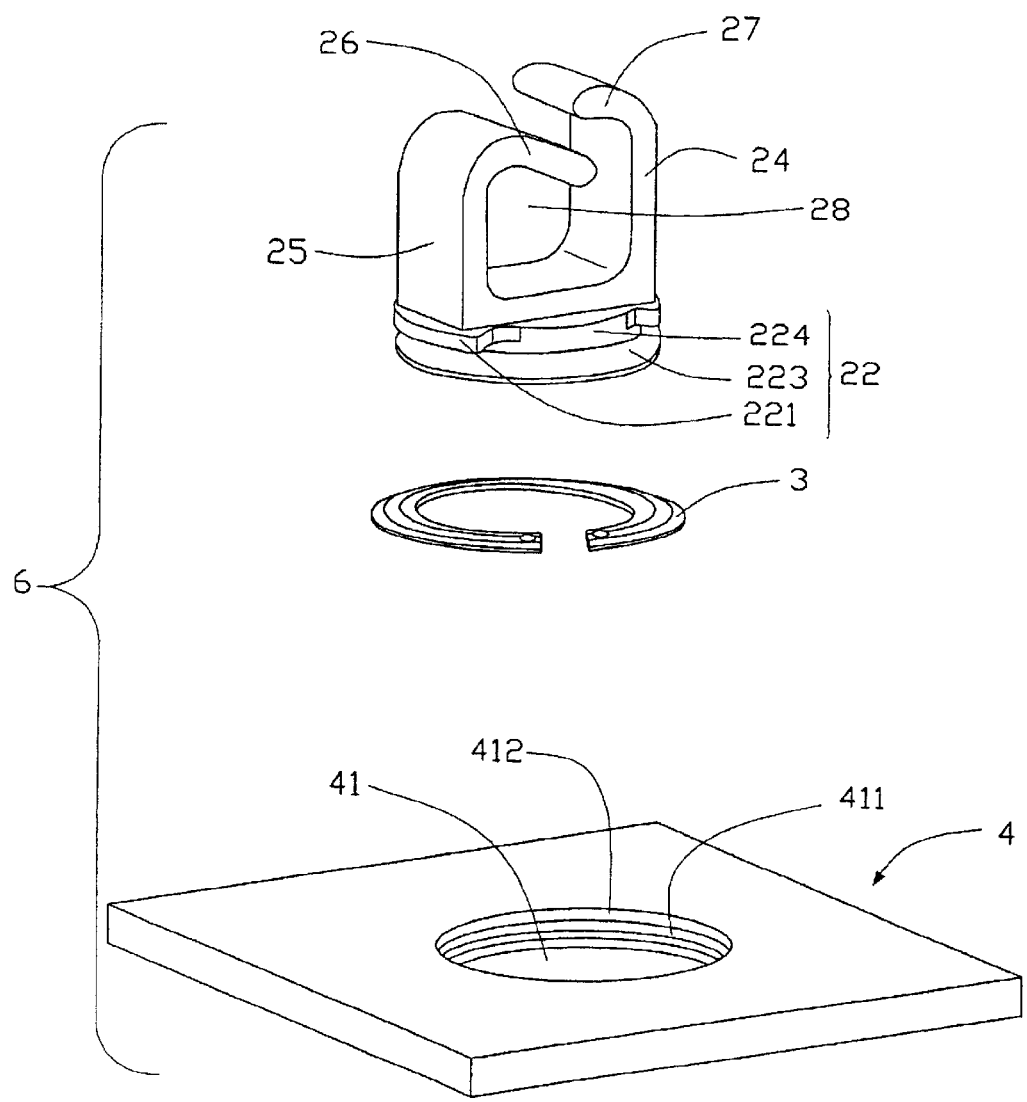
FIG. 3 is an exploded view of the optical fiber holder of FIG. 1.
Figure 4:
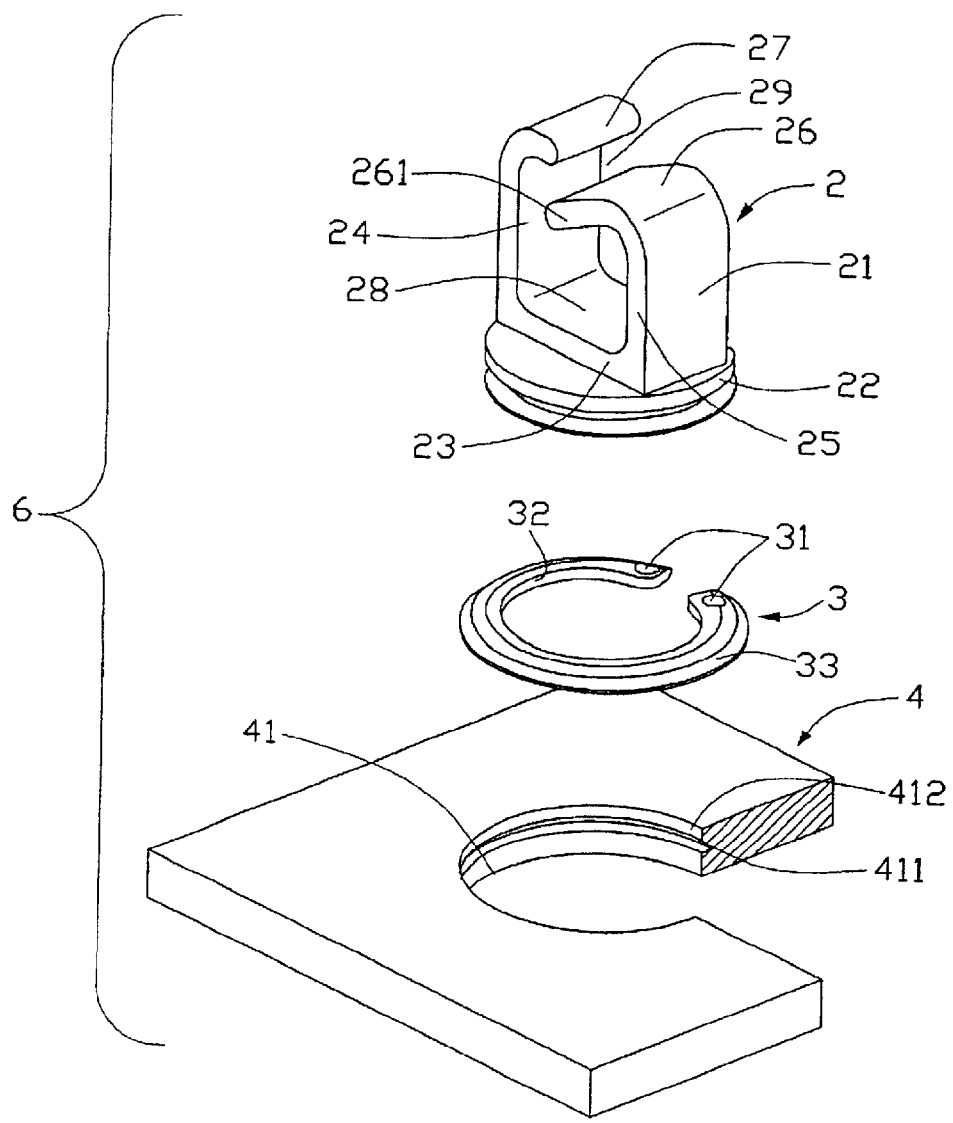
FIG. 4 is an exploded view of the optical fiber holder of FIG. 1, but viewed from another aspect, and with part of a base thereof cut away for clarity.

Referring to FIGS. 3 and 4, the C-shaped spacer 3 is made of metal. The C-shaped spacer 3 has an inner surface 32 and an outer surface 33. Two holes 31 are defined at opposite ends of the C-shaped spacer 3 respectively.

The base 4 defines a circular fixing hole 41 therein. A diameter of the fixing hole 41 is slightly larger than the diameters of the annular flange 221 and slanted base part 223. The diameter of the fixing hole 41 is slightly less than an outer diameter of the C-shaped spacer 3. The fixing hole 41 is surrounded by an inner surface 412 of the base 4. An annular fixing groove 411 is defined in the base 4 in a middle portion of the inner surface 412, and in communication with the fixing hole 41. A profile of the fixing groove 411 is dimensioned to correspond with the outer surface 33 of the C-shaped spacer 3, to ensure effective mating of the C-shaped spacer 3 with the base 4.

FIG. 1 shows the optical fiber holder 6 fully assembled. A method for assembling the optical fiber holder 6 comprises the steps of: (1) attaching the C-shaped spacer 3 around the main body 222 of the optical fiber retainer 2, with the holes 31 of the C-shaped spacer 3 being exposed to the cutout 224 of the annular flange 221; (2) resiliently closing the C-shaped spacer 3 such that the inner surface 32 thereof substantially abuts the main body 222; and (3) snapping the combined C-shaped spacer 3 and optical fiber retainer 2 into the fixing hole 41 of the base 4. Once the combined C-shaped spacer 3 and optical fiber retainer 2 is received in the fixing hole 41 of the base 4, the C-shaped spacer 3 resiliently expands back toward its original shape, such that the C-shaped spacer 3 is tightly retained in the fixing groove 411 of the base 4. The inner surface 32 of the C-shaped spacer 3 is slidably engaged with the main body 222. Thus the optical fiber retainer 2 can freely rotate relative to the retained C-shaped spacer 3.

Figure 5:
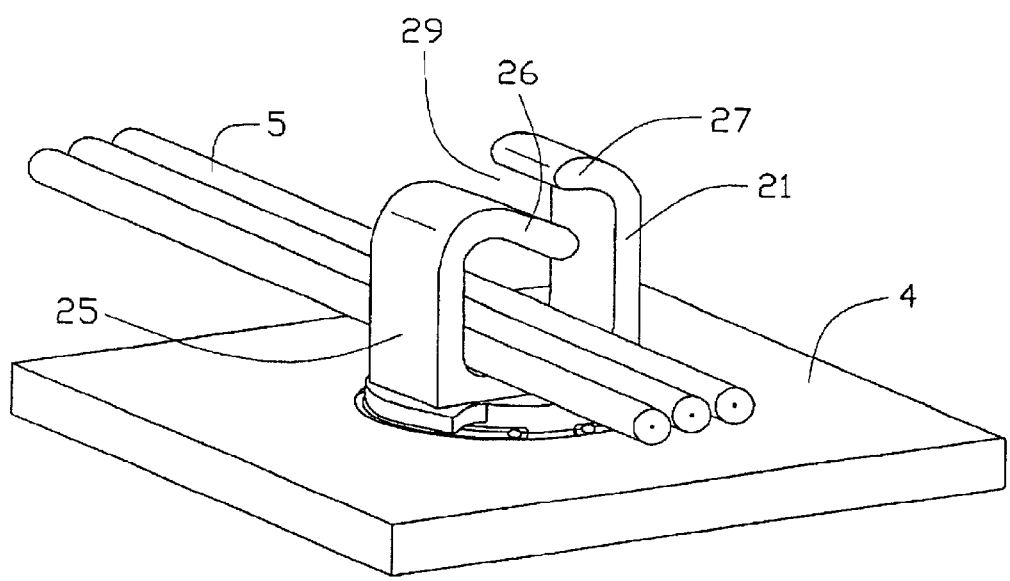
FIG. 5 is similar to FIG. 1, but also showing a plurality of optical fibers retained in the optical fiber holder.

Referring to FIG. 5, a method of retaining each optical fiber 5 in the optical fiber holder 6 in accordance with the present invention comprises the steps of: (1) placing the optical fiber 5 at the opening 29 of the retaining portion 21 of the optical fiber retainer 2; (2) downwardly pressing the first bent portion 27 of the retaining portion 21 to increase a distance between the first and second bent portions 27, 26; and (3) passing the optical fiber 5 through the opening 29 into the retaining space 28. Once the optical fiber 5 is received in the retaining space 28, the first bent portion 27 resiliently returns to its original position. The optical fiber 5 is thus prevented from escaping back out from the retaining portion 21 through the opening 29.

A method of disassembling the optical fiber holder 6 comprises the steps of: (1) engaging tweezers in the holes 31 of the C-shaped spacer 3; (2) squeezing the ends of the C-shaped spacer 3 toward each other such that the outer diameter of the C-shaped spacer 3 becomes less than the diameter of the fixing hole 41 of the base 4; and (3) pulling the combined optical fiber retainer 2 and C-shaped spacer 3 out of the base 4.

The optical fiber holder 6 of the present invention can be utilized within a housing of an optical device to arrange and retain a plurality of optical fibers therein. Such optical device include, for example, wavelength division multiplexers and optical amplifiers. Furthermore, the optical fiber holder 6 can be appropriately sized to hold a variety of optical fiber cables.

While preferred embodiments in accordance with the present invention have been shown and described, equivalent modifications and changes known to persons skilled in the art according to the spirit of the present invention are considered within the scope of the present invention as defined in the appended claims.

What is claimed is:

1. A rotatable holder comprising:
    a retainer comprising
        a retaining portion comprising a lower part, a first wall, and a second wall opposite the first wall, the first and second walls extending upwardly from the lower part, and
        a fixing portion comprising a cylindrical main body, a flange formed around a periphery of the cylindrical main body, and a base part, the cylindrical body, flange and base part cooperatively defining a groove therebetween;
    a C-shaped spacer encircling the cylindrical body and received in the groove of the retainer; and
    a base comprising a fixing hole defined therein, an annular groove being defined in the base at the fixing hole;
    wherein the C-shaped spacer is retained in the annular groove of the base, and the retaining portion is rotatable within the C-shaped spacer.

2. The rotatable holder as described in claim 1, wherein at least one of the first and second walls of the retainer comprises a bent portion for preventing an optical fiber retained in the retainer from escaping from the retainer.

3. The rotatable holder as described in claim 1, wherein two holes are defined at opposite ends of the C-shaped spacer.

4. An optical fiber holder for holding a plurality of optical fibers therein, the optical fiber holder comprising:
    a retainer comprising a retaining portion for retaining the optical fibers, and a fixing portion having a cylindrical body;
    a spacer; and
    a base defining a fixing hole, a fixing groove being defined in the base around the fixing hole;
    wherein the spacer encircles the cylindrical body of the retainer, and is received in the fixing groove of the base.

5. The optical fiber holder as described in claim 4, wherein the retaining portion further comprises a first wall, a second wall and a lower portion, the first wall, second wall and lower portion cooperatively defining a retaining space therebetween for retaining the optical fibers therein.

6. The optical fiber holder as described in claim 5, wherein at least one of the first and second walls of the retainer comprises a bent portion for preventing optical fibers retained in the retaining portion from escaping from the retaining portion.

7. The optical fiber holder as described in claim 4, wherein the fixing portion further comprises a flange and a base part, and the cylindrical body, the flange and the base part cooperatively define a groove therebetween for receiving the spacer.

8. The optical fiber holder as described in claim 4, wherein the spacer is generally C-shaped.

9. The optical fiber holder as described in claim 8, wherein two holes are defined at opposite ends of the spacer.

10. An optic fiber holder comprising:
    a retainer including an upper fiber retaining portion and a lower fixing portion;
    said fixing portion defining an outer annular groove;
    a radial expandable spacer located in said groove; and
    a base plate defining a through hole with an inner annular groove of an interior periphery thereof; wherein
        said outer groove is dimension to be deep enough to allow said spacer to be radially inwardly moveably received therein when said fixing portion with said spacer is downwardly inserted into the through hole, and then said spacer is radially outwardly moved to have outer portions of said spacer engaged within said inner groove while still keeping inner portions of said spacer received within the outer groove, so as to maintain the spacer and the associated fixing portion in a fixed position relative to the base plate.

11. The holder as described in claim 10, wherein said fixing portion defines means for partially exposing said spacer to an exterior in a vertical direction for easy assembling/disassembling of the spacer and the associated fixing portion with regard to the base plate.

* * * * *